United States Patent
Zeiger et al.

(10) Patent No.: US 12,328,226 B2
(45) Date of Patent: Jun. 10, 2025

(54) AUTOMATED APPLICATION SERVICE DETECTION FOR CONFIGURING INDUSTRIAL COMMUNICATION NETWORKS

(71) Applicant: Siemens Aktiengesellschaft, Munich (DE)

(72) Inventors: Florian Zeiger, Höhenkirchen-Siegertsbrunn (DE); Andreas Zirkler, Ottobrunn (DE); Reinhard Frank, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 27 days.

(21) Appl. No.: 18/565,925

(22) PCT Filed: May 11, 2022

(86) PCT No.: PCT/EP2022/062825
§ 371 (c)(1),
(2) Date: Nov. 30, 2023

(87) PCT Pub. No.: WO2022/253538
PCT Pub. Date: Dec. 8, 2022

(65) Prior Publication Data
US 2024/0259264 A1  Aug. 1, 2024

(30) Foreign Application Priority Data
Jun. 1, 2021 (EP) .................................... 21177216

(51) Int. Cl.
*H04L 29/08* (2006.01)
*G06F 8/60* (2018.01)
(Continued)

(52) U.S. Cl.
CPC ............ *H04L 41/0816* (2013.01); *G06F 8/60* (2013.01); *H04L 41/0681* (2013.01); *H04L 43/04* (2013.01)

(58) Field of Classification Search
CPC . H04L 41/0816; H04L 41/0681; H04L 43/04; H04L 29/08; G06F 8/60; G05B 23/02; G05B 19/418
(Continued)

(56) References Cited

U.S. PATENT DOCUMENTS

2018/0227277 A1*  8/2018  Fischer ............... H04W 12/106
2020/0028791 A1  1/2020  McGrath ............... H04L 47/564
(Continued)

OTHER PUBLICATIONS

Search Report for International Application No. PCT/EP2022/062825, 16 pages, Aug. 29, 2022.
(Continued)

*Primary Examiner* — Jude Jean Gilles
(74) *Attorney, Agent, or Firm* — Slayden Grubert Beard PLLC

(57) ABSTRACT

Various embodiments of the teachings herein include a method for configuring an industrial communication network. The method may include: deploying an application to a digital twin set up to represent an industrial communication system, devices connected to the network, processes, and physical interactions; running the application on the digital twin; collecting data of the application's communication traffic; classifying the application's end points and communication characteristics based on the collected communication traffic; changing the communication characteristics of the communication links until reaching limits of performance quality; deriving network parameters required by the application; and configuring the industrial communication network based on the determined network parameters.

14 Claims, 2 Drawing Sheets

(51) Int. Cl.
  *H04L 41/0681* (2022.01)
  *H04L 41/0816* (2022.01)
  *H04L 43/04* (2022.01)
  *G05B 19/418* (2006.01)
  *G05B 23/02* (2006.01)

(58) Field of Classification Search
  USPC .......................................................... 709/221
  See application file for complete search history.

(56) References Cited

U.S. PATENT DOCUMENTS

| 2020/0142365 | A1  | 5/2020  | Sharma | G05B 13/048  |
| 2020/0225655 | A1* | 7/2020  | Cella  | G05B 23/0221 |
| 2020/0348662 | A1* | 11/2020 | Cella  | G05B 19/41865 |
| 2020/0389373 | A1  | 12/2020 | Barton | H04L 41/5048 |
| 2021/0157312 | A1* | 5/2021  | Cella  | G01M 13/045  |

OTHER PUBLICATIONS

Fannia Pacheco, E. E. (2018), Towards the Deployment of Ma-chine Learning Solutions in Network Traffic Classification: A Systematic Survey. Communications Surveys and Tutorials, IEEE Communications Society, 21 (2), S. pp. 1988-2014, 2018.

Thuy T.T. Nguyen, G. A. (Fourth Quarter 2008), A Survey of Techniques for Internet Traffic Classification using Machine Learning, IEEE Communications Surveys & Tutorials, vol. 10, No. 4, 2008.

* cited by examiner

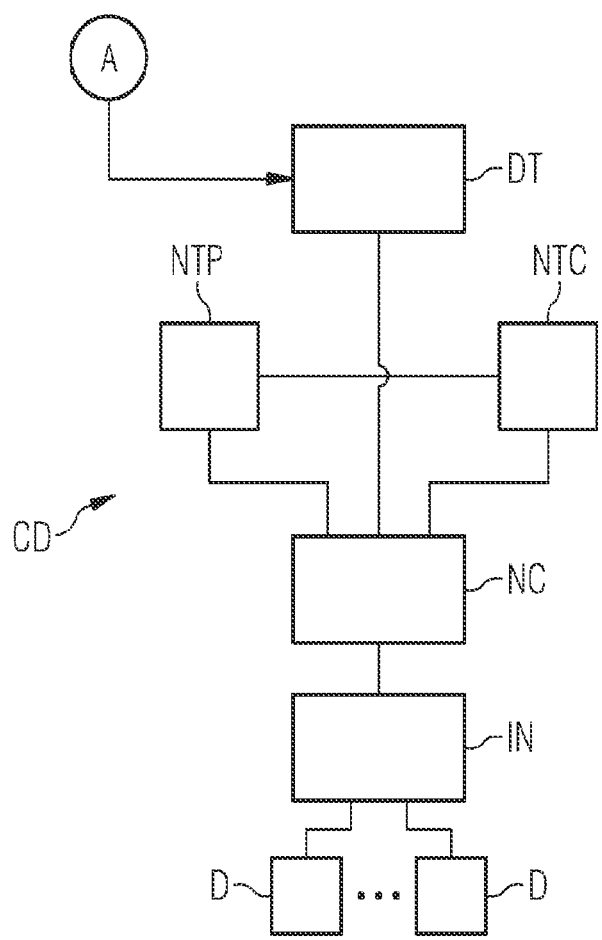

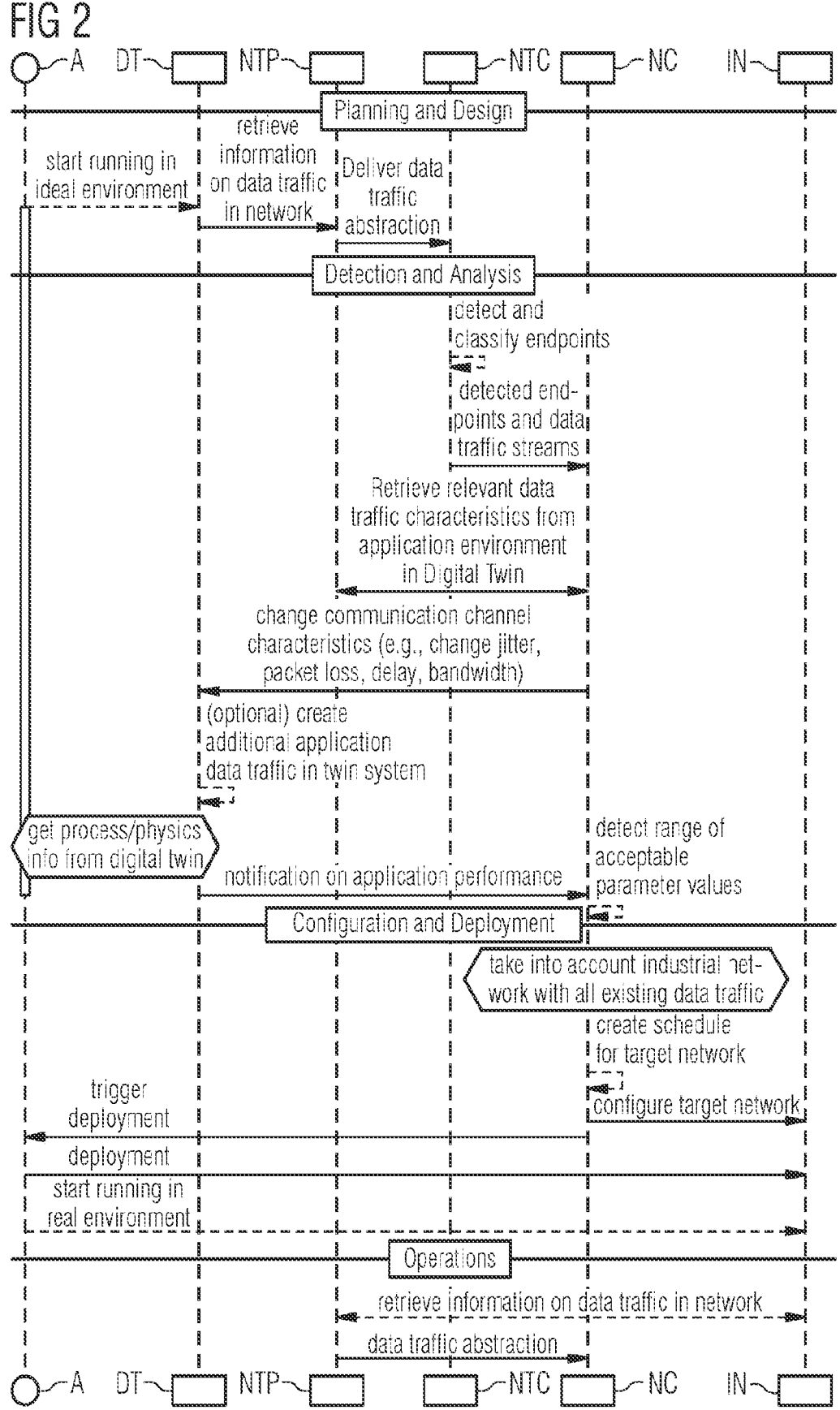

AUTOMATED APPLICATION SERVICE DETECTION FOR CONFIGURING INDUSTRIAL COMMUNICATION NETWORKS

CROSS-REFERENCE TO RELATED APPLICATIONS

This application is a U.S. National Stage Application of International Application No. PCT/EP2022/062825 filed May 11, 2022, which designates the United States of America, and claims priority to EP Application No. 21177216.5 filed Jun. 1, 2021, the contents of which are hereby incorporated by reference in their entirety.

TECHNICAL FIELD

The present disclosure relates to industrial communication networks. Various embodiments of the teachings herein include automated methods and/or arrangements for configuring an industrial communication network using a digital twin.

BACKGROUND

Communication Networks are a medium to transfer data. Networks, however, vary based on the volume of data being transferred. Industrial communication Networks refer to networks that deal with transfer of data on a large scale. This means, they allow to connect various devices across large spaces and enable communication between them by allowing to transfer huge chunks of data between them.

Industrial applications usually have very specific requirements, such as determinism in communication, reliability, and many more. Such requirements are very process specific and use case specific, and usually cannot be easily "guessed" but need careful consideration with usually a large amount of manual work. Especially for application development, but also for system integration it is often not possible to completely capture or to easily describe by simple values. Unprecise or incomplete descriptions of requirements, or even wrong parameter settings will result in unreliable operations of industrial applications. Another "extreme" but typical setup is the parameterization of the system with far too high requirements, leading to an over-reservation of system resources.

The following small example describes problems arising for a typical question: When does a device interface need to send a data packet, so that arrival at a time X decided by a TSN (=time-sensitive networking) controller is adhered to? Typical tasks and problems are:
  Application or application end point A is a sensor and wants to send packets to application or application end point B with the sent interval of time X.
  The application or application end point B is a control application and wants to send packets to an actuator C every Y Nanoseconds—within a given cycle time of the application.
  Ideally, endpoint B intends to send after a packet from end point A is received.
  The underlying network must serve both requests, but the requirement to send after receiving a packet from end point A is not taken care of.
  Current solutions require the applications or a configuration tool to send a service request to the control entity (=network controller). The creation of such a service request is not easily possible in automation and production environments, as industrial applications have a very specific set of requirements—quite different from the requirements we know from the IT world.

To create such a communication request, the application developer usually provides mechanisms to capture the communication requirements (e.g., through user input) so that the application can create and send the service request. An automation of that procedure is currently not available. The current procedure is even more complex and error prone.

When formulating the requirements on the communication service, the application developer must take timing constraints caused e.g., by network interfaces, network stacks, operating system, etc. into account, which is often difficult or impossible for him. Particularly considering the development of portable apps, where the destination hardware and eventually operating system is variable.

SUMMARY

The teachings of the present disclosure include solutions for an automated detection of application service in industrial communication networks. For example, some embodiments include an automated method for configuring an industrial communication network (IN), comprising: deploying an application (A), which is deployable to the industrial communication network (IN), to a digital twin (DT), whereby the digital twin is set up to represent the application, to represent a digital representation of an industrial communication system which is comprising the industrial communication network (IN), devices (D) connected to the industrial communication network, and processes, and to represent physical interactions in the industrial communication system, running the application (A) on the digital twin (DT), whereby data of the application's communication traffic is collected, application's end points and their corresponding communication characteristics in the industrial communication network are initially detected and classified based on the collected application's communication traffic, the initially detected communication characteristics of the communication links used by the application are changed until reaching limits of pre-defined application performance quality, and from thereof determined communication characteristics network parameters for the communication service required by the application are derived, and configuring the industrial communication network based on the determined network parameters.

In some embodiments, communication characteristics comprise delay, jitter, and packet loss.

In some embodiments, the application performance quality comprises pre-defined quality parameters and/or a pre-defined functional envelope.

In some embodiments, changing the communication characteristics comprises adding of additional delay on links, creating packet loss, and/or re-aligning of send times of different streams in relation to each other by adding additional communication services requiring resources from the industrial communication network or re-arranging communication network schedules.

In some embodiments, devices comprise sensors and/or actuators.

In some embodiments, the application performance quality (=QoS parameters of communication streams) is continuously monitored and in case of deviations from pre-defined minimum requirements an alarm is generated.

In some embodiments, status feedback data of real machinery the application is dedicated for is used for modifying the communication characteristics.

As another example, some embodiments include an arrangement comprising an industrial communication network (IN) and one or more computational devices (CD), whereby the one or more computational devices (CD) comprises a digital twin (DT), a Network Information Provider and Monitoring module (NTP), Network Traffic Classification module (NTC) and a Network Controller module (NC), whereby the digital twin (DT) is setup to run a deployed application (A), which is deployable to the industrial communication network, to represent the application, to represent a digital representation of an industrial communication system which is comprising the industrial communication network, devices (D) connected to the industrial communication network, and processes, and to represent physical interactions in the industrial communication system, whereby the Network Information Provider and Monitoring module (NTP) is setup to retrieve network data traffic characteristics from a communication network, a digital representation of such a communication network, or a simulated or emulated network, whereby the Network Traffic Classification module (NTC) is setup to classify endpoint types of the industrial communication network and to classify detected application data traffic, whereby the Network Controller module (NC) is setup to configure network devices in the digital twin as well as in the industrial communication network to embed data flows, and is setup to detect active topology, including network device properties and capabilities, whereby the Industrial communication Network (IN) is a real network setup to run and operate an industry plant, whereby the network traffic classification module (NTC) is setup to initially detect and classify application's end points and their corresponding communication characteristics in the industrial communication network based on the collected application's communication traffic monitored by the Network Information Provider and Monitoring module, whereby the digital twin (DT) is setup to change the initially detected communication characteristics of the communication links used by the application until reaching limits of pre-defined application performance quality, whereby the network controller module (NC) is setup to derive from thereof determined communication characteristics network parameters for the communication service required by the application, and is set up to configure the industrial communication network based on the determined network parameters.

In some embodiments, communication characteristics comprise delay, jitter, and packet loss.

In some embodiments, the application performance quality comprises pre-defined quality parameters and/or a pre-defined functional envelope.

In some embodiments, changing the communication characteristics comprises adding of additional delay on links, creating packet loss, and/or re-aligning of send times of different streams in relation to each other by adding additional communication services requiring resources from the industrial communication network or re-arranging network schedules.

In some embodiments, devices comprise sensors and/or actuators.

In some embodiments, the Network Information Provider and Monitoring module (NTP) is setup to continuously monitor the application performance quality and in case of deviations from pre-defined minimum requirements to generate an alarm.

In some embodiments, the digital twin (DT) is setup to use status feedback data of real machinery the application is dedicated for to modify the communication characteristics.

BRIEF DESCRIPTION OF THE DRAWINGS

FIG. 1 shows a block diagram of an example arrangement incorporating teachings of the present disclosure; and FIG. 2 shows a flow chart of an example method for configuration of an industrial communication network incorporating teachings of the present disclosure.

DETAILED DESCRIPTION

Some embodiments of the teachings herein include an automated support method to detect application services and their parameters in such an industrial communication system is introduced. The method also gives a network controller information on the type of application that is sending the data packets. As typically network controllers (e.g., a TSN controller) does not automatically know how to handle and parameterize the data traffic of an application. The proposed method will detect data packet timing of the industrial applications' communication endpoints (e.g., sensors, actuators, applications). This parameter detection can be used in all types of setups, such as systems that follow the perceive—analyse—act paradigm, and in systems with asynchronous communication.

The mechanism described allows an automated assessment of application requirements, that must be fulfilled by the industrial communication system. Thus, application developers as well as system integrators can easily deploy applications in industrial communication environments with a reduced risk of system misconfiguration.

Some embodiments include an automated method for configuring an industrial communication network, comprising:
    deploying an application, which is deployable to the industrial communication network, to a digital twin, whereby the digital twin is set up to represent the application, to represent a digital representation of an industrial communication system which is comprising the industrial communication network, devices connected to the industrial communication network, and processes, and to represent physical interactions in the industrial communication system,
    running the application on the digital twin, whereby data of the application's communication traffic is collected,
    application's end points and their corresponding communication characteristics in the industrial communication network are initially detected and classified based on the collected application's communication traffic,
    the initially detected communication characteristics of the communication links used by the application are changed until reaching limits of pre-defined application performance quality, and
    from thereof determined communication characteristics network parameters for the communication service required by the application are derived,
    and configuring the industrial communication network based on the determined network parameters.

The communication characteristics are changed until the application performance degrades under pre-defined thresholds of required communication service requirements or fails to function properly, thereof finding the limits of the communication characteristics the application can stand without degradation of process quality. In other words, the application's communication is "pushed to the limits" and the Digital Twin will notify as soon as the application fails, e.g., a control loop is not able any more to control a physical process in the digital twin, results of processes are outside the required operational envelope.

By assessing the behavior of an application in a digital twin environment, the network and communication effects, the host system where application endpoints are running, and other applications running in the system and causing data traffic are considered.

In some embodiments, the communication characteristics comprise delay, jitter, and packet loss.

In some embodiments, the application performance quality comprises pre-defined quality parameters and/or a pre-defined functional envelope.

In some embodiments, changing the communication characteristics comprises adding of additional delay on links, creating packet loss, and/or re-aligning of send times of different streams in relation to each other by adding additional communication services requiring resources from the industrial communication network or re-arranging network schedules.

In some embodiments, devices comprise sensors and/or actuators.

In some embodiments, the application performance quality (=QoS parameters of communication streams) is continuously monitored and in case of deviations from pre-defined minimum requirements an alarm is generated.

In some embodiments, status feedback data of real machinery the application is used for modifying the communication characteristics.

Whenever additional applications or components are added to a plant using the industrial communication network, or existing ones are to be modified or deleted, planning and design phase might be re-entered.

Some embodiments include an arrangement comprising an industrial communication network and one or more computational devices, whereby the one or more computational devices comprises a digital twin, a Network Information Provider and Monitoring module, Network Traffic Classification module and a Network Controller module, In some embodiments, the digital twin is setup to run a deployed application, which is deployable to the industrial communication network, and to represent the application, to represent a digital representation of an industrial communication system which is comprising the industrial communication network, devices connected to the industrial communication network, and processes, and to represent physical interactions in the industrial communication system.

In some embodiments, the Network Information Provider and Monitoring module is setup to retrieve network data traffic characteristics from a communication network, a digital representation of such a communication network, or a simulated or emulated network. It can retrieve measurement data from network devices and application endpoints such as hosts or virtualized compute environments, such as virtual machines or software containers. Network data traffic characteristics can be obtained through active or passive monitoring. Typical network data traffic characteristics are end-2-end (e2e) delay of data packets exchanged between application endpoints, bandwidth used by an e2e data stream, jitter of the packets within a data stream, packet losses, packet sizes, and many more.

In some embodiments, the Network Traffic Classification module is setup to classify endpoint types of the industrial communication network and to classify detected application data traffic. Classification of endpoints can be done based on its data traffic characteristics and is a well-known domain in traditional Internet data traffic engineering. Nevertheless, these traditional approaches have their limitations and the component in this invention is designed to use also more recently developed approaches using artificial intelligence and machine learning, e.g., Thuy T. T. Nguyen, G. A. (FOURTH QUARTER2008), A Survey of Techniques for Internet Traffic Classification using Machine Learning, IEEE COMMUNICATIONS SURVEYS & TUTORIALS, VOL. 10, NO. 4, to capture the special nature of industrial communication data traffic, and to take the special needs of the end points into account.

In some embodiments, the Network Controller module is setup to configure network devices in the digital twin as well as in the industrial communication network to embed data flows, and is setup to detect active topology, including network device properties and capabilities. Configuration of network devices is typically done based on communication service requests coming from an end station (via User-Network-Interface, UNI), or via its northbound interface from a central management unit.

In some embodiments, the Industrial communication Network is a real network setup to run and operate an industry plant. Here the real applications are controlling the real industrial processes and actuators based on the data from sensors, etc.

In some embodiments, the network traffic classification module is setup to initially detect and classify application's end points and their corresponding communication characteristics in the industrial communication network based on the collected application's communication traffic monitored by the Network Information Provider and Monitoring module, In some embodiments, the digital twin is setup to change the initially detected communication characteristics of the communication links used by the application until reaching limits of pre-defined application performance quality, In some embodiments, the network controller module is setup to derive from thereof determined communication characteristics network parameters for the communication service required by the application, and is set up to configure the industrial communication network based on the determined network parameters.

In some embodiments, communication characteristics comprise delay, jitter, and packet loss.

In some embodiments, the application performance quality comprises pre-defined quality parameters and/or a pre-defined functional envelope.

In some embodiments, changing the communication characteristics comprises adding of additional delay on links, creating packet loss, and/or re-aligning of send times of different streams in relation to each other by adding additional communication services requiring resources from the industrial communication network or re-arranging communication network schedules.

In some embodiments, devices comprise sensors and/or actuators.

In some embodiments, the Network Information Provider and Monitoring module is setup to continuously monitor the application performance quality and in case of deviations from pre-defined minimum requirements to generate an alarm.

In some embodiments, the digital twin is setup to use status feedback data of real machinery the application is dedicated for to modify the communication characteristics.

Further benefits and advantages of various embodiments of the teachings of the present disclosure will become apparent after a careful reading of the detailed description with appropriate reference to the accompanying drawings.

FIG. 1 shows a block diagram of an example communication arrangement incorporating teachings of the present disclosure. The arrangement has three major components, a Network Information Provider and Monitoring module NIP, a Network Traffic Classification module NTC, and a Network Controller module NC, interacting with other components in an industrial control system, such as applications A, a Digital Twin DT, and the industrial communication network IN, itself. If the digital twin DT environment is not available and the real system is in testing and configuration phase, of course also the real system can be used for the training. All modules and the digital twin DT can be implemented in one or more computational devices CD.

Network Information Provider and Monitoring module NIP is a software-implemented component that can retrieve network data traffic characteristics from a communication network, a digital representation of such a communication network, or a simulated or emulated network. It can retrieve measurement data from network devices and application endpoints such as hosts or virtualized compute environments, such as virtual machines or software containers. Network data traffic characteristics can be obtained through active or passive monitoring. Typical network data traffic characteristics are end-2-end (e2e) delay of data packets exchanged between application endpoints, bandwidth used by an e2e data stream, jitter of the packets within a data stream, packet losses, packet sizes, and many more.

Network Traffic Classification module NTC: In industrial communication systems exist many different types of devices D (e.g., sensors, actuators, industrial PCs) as well as different applications A (e.g., SCADA software, control applications, monitoring data streams). The Network Traffic Classification module NTC can classify the endpoint types and can do a classification of the detected application data traffic.

Classification of endpoints can be done based on its data traffic characteristics and is a well-known domain in traditional Internet data traffic engineering. Nevertheless, these traditional approaches have their limitations and the component in this invention is designed to use also more recently developed approaches using artificial intelligence and machine learning, e.g., Thuy T. T. Nguyen, G. A. (FOURTH QUARTER2008), A Survey of Techniques for Internet Traffic Classification using Machine Learning, IEEE COMMUNICATIONS SURVEYS & TUTORIALS, VOL. 10, NO. 4, to capture the special nature of industrial communication data traffic, and to take the special needs of the end points into account.

Network Controller module NC can configure network devices in the digital twin DT, as well as in the industrial communication network to embed data flows, etc. To enable that, it can detect the active topology, including device properties and capabilities. Configuration of network devices is typically done based on communication service requests coming from an end station (via User-Network-Interface, UNI), or via its northbound interface from a central management unit.

Application A represents any type of application A that is present or should be deployed in an industrial communication network IN. Of particular interest for this invention are applications with strict, even though inexplicit, requirements on quality of service for its communication relations, e.g., time-sensitive applications.

The Digital Twin DT represents the complete industrial system, including digital representations of the industrial communication network, the devices, e.g., sensors, actuators, as well as digital representations of the applications A, processes, and physical interactions.

The Industrial communication Network IN is the real network that is used to run and operate the industry plant. Here the real applications are controlling the real industrial processes and actuators based on the data from sensors, etc.

FIG. 2 illustrates an example method for creation of an industrial communication network incorporating teachings of the present disclosure. The network, with its sensors, actuators, control processes and applications, can be structured in four phases, with the main components' major functions:

Planning and Design Phase

In this initial phase, application A that should be deployed to the industrial communication network IN is first deployed in the digital twin DT. After the application A is deployed and started in the digital twin DT, the network information provider and monitoring module NIP can start to collect data of the application's A communication. The data can already be used for initial classification of the application end point types and the corresponding data traffic. Whenever additional applications A or components are added to a plant using the industrial communication network IN, or existing ones are to be modified or deleted, planning and design phase might be re-entered.

Detection and Analysis Phase

Now the Network Traffic Classification module NTC will identify the type of the data flows and end points. Here different approaches can be used, e.g., Fannia Pacheco, E. E. (2018), Towards the Deployment of Machine Learning Solutions in Network Traffic Classification: A Systematic Survey. Communications Surveys and Tutorials, IEEE Communications Society, 21 (2), S. pp. 1988-2014.

The classification results are passed to the software-implemented network controller module NC so that the network controller module NC can receive the relevant data traffic characteristics from the Network Information Provider and Monitoring module NIP, in the same manner it receives communication service requests according to state of the art. As just assessing data from the application A running in an ideal environment is not enough to create communication pattern useful for the real world, the network controller module NC now starts changing the communication characteristics of the communication links used by the application in the Digital Twin DT.

Changing the communication characteristics includes adding of additional delay on links, creating packet loss, re-aligning of send times of different streams in relation to each other, etc. by (virtually) adding additional communication services requiring resources from the network, or re-arranging network schedules. Thus, the application's A communication is "pushed to the limits" and the Digital Twin DT will notify the network controller module NC as soon as the application A fails (e.g., a control loop is not able any more to control a physical process in the digital twin, results of processes are outside the required operational envelope).

An optional extension for that assessment can also be the use of real machinery, e.g., after adding a delay in the communication of the real system, the surface quality after milling does not satisfy the quality requirements anymore. Then this real-world data can be used by the network controller module NC as well. By using this status feedback of the application, the network controller module NC gets a clear view of the applications' requirements for the communication channel (s)—without the application explicitly asking for them. The determined parameter ranges can be used for further scheduling tasks of the network controller.

Configuration and Deployment Phase

After the detection and analysis phase, the network controller module NC knows the upper bounds of delay, jitter, and packet loss the application can stand without degradation of process quality (="its limits"). From that it can derive parameters for the communication service required by the application A. These parameters will typically be significantly less demanding than the parameters observed by monitoring the "undisturbed" communication of the application in planning and design phase. The Network Controller module NC will then configure the physical industrial communication network IN, including end stations, based on the determined parameters. Afterwards, it can inform application A or an application deployment framework (e.g., Kubernetes) about successful enforcement of their required communication relations, thus trigger productive operation.

Operations Phase

During operation, the real application A exchanges data through the physical communication network. From the Detection and Analysis phase, the network controller module NC knows the real QoS requirements for each communication service of the application A. In some embodiments, the Network Information Provider and Monitoring module NIP continuously monitor Qos parameters of relevant streams and alarm the network controller module NC in case of deviations from the defined minimum requirements.

Traditional approaches require a detailed specification of the applications' communication requirements, so that the network controller can configure and embed the corresponding data traffic flows accordingly. To specify the applications' communication requirements is a very complicated task as it involved knowledge from the applications' workflows, the involved physical processes, and knowledge of the interfaces to other systems in the production environment. Such a knowledge is usually not available through one single person but must be consolidated by experts of different domains, such as the application developer, the subject matter expert for the production process, the operator of the production, a system integrator.

The approach described herein offers automated support for describing the applications' A requirements and uses this information to derive automatically the applications' A communication quality parameters required for the network controller to appropriately embed the data traffic flow.

The described method must handle applications that follow the "perceive-analyze-act" paradigm for process control, where the action based on a received sensor data reading is given in the same cycle—e.g., sensor data is received at the beginning of a cycle, then the reaction is calculated, and at the end of the cycle, the response command is sent to the process actuators. But of course, the described approach can also be used in parallelized processing of sensor readings and control command—e.g., the cycle is here not the main criterion for sending and receiving, and control responses are calculated as soon as a sensor data reading is received (and this does not necessarily happen in the beginning of the cycle).

Although the teachings herein have been explained in relation to example embodiments as mentioned above, it is to be understood that many other possible modifications and variations can be made without departing from the scope of the present disclosure. It is, therefore, contemplated that the appended claim or claims will cover such modifications and variations that fall within the true scope thereof.

LIST OF REFERENCE SIGNS

A Application
CD Computational device
D Device
DT Digital Twin
IN Industrial communication Network
NC Network Controller
NIP Network Information Provider and Monitoring module
NTC Network Traffic Classification module

What is claimed is:

1. A method for configuring an industrial communication network, the method comprising:
    deploying an application to a digital twin set up to represent an industrial communication system of the industrial communication network, devices connected to the industrial communication network, processes, and physical interactions in the industrial communication system;
    running the application on the digital twin;
    collecting data of the application's communication traffic;
    detecting and classifying the application's end points and their corresponding communication characteristics in the industrial communication network based on the collected application's communication traffic;
    changing the initially detected communication characteristics of the communication links used by the application until reaching limits of pre-defined application performance quality;
    deriving determined communication characteristics network parameters for the communication service required by the application; and
    configuring the industrial communication network based on the determined network parameters.

2. Method according to claim 1, wherein the communication characteristics comprise delay, jitter, and packet loss.

3. Method according to claim 1, wherein the application performance quality comprises pre-defined quality parameters and/or a pre-defined functional envelope.

4. Method according to claim 1, wherein changing the communication characteristics comprises adding of additional delay on links, creating packet loss, and/or re-aligning of send times of different streams in relation to each other by adding additional communication services requiring resources from the industrial communication network or re-arranging communication network schedules.

5. Method according to claim 1, wherein the devices comprise sensors and/or actuators.

6. Method according to claim 1, further comprising:
    continuously monitoring the application performance quality (=QoS parameters of communication streams); and
    generating an alarm in response to deviations from pre-defined minimum requirements.

7. Method according to claim 1, wherein modifying the communication characteristics includes using status feedback data of real machinery the application is dedicated for.

8. An arrangement comprising:
    an industrial communication network; and
    a set of computational devices including a digital twin, a Network Information Provider and Monitoring module, a Network Traffic Classification module; and a Network Controller module;

wherein the digital twin runs a deployed application to represent an industrial communication system including the industrial communication network, a second set of computational devices connected to the industrial communication network, processes, and physical interactions in the industrial communication system;

the Network Information Provider and Monitoring module retrieves network data traffic characteristics from a communication network, a digital representation of such a communication network, or a simulated or emulated network, the Network Traffic Classification module classifies endpoint types of the industrial communication network and detected application data traffic;

the Network Controller module configures network devices in the digital twin as well as in the industrial communication network to embed data flows, and detects active topology, including network device properties and capabilities, the Industrial communication Network comprises a real network setup to run and operate an industry plant;

the network traffic classification module initially detects and classifies application's end points and corresponding communication characteristics in the industrial communication network based on the collected application's communication traffic monitored by the Network Information Provider and Monitoring module;

the digital twin changes the initially detected communication characteristics of the communication links used by the application until reaching limits of pre-defined application performance quality; and the network controller module derives determined communication characteristics network parameters for the communication service required by the application, and configures the industrial communication network based on the determined network parameters.

9. Arrangement according to claim 8, wherein the communication characteristics comprise delay, jitter, and packet loss.

10. Arrangement according to claim 8, wherein the application performance quality comprises pre-defined quality parameters and/or a pre-defined functional envelope.

11. Arrangement according to claim 8, wherein changing the communication characteristics comprises adding of additional delay on links, creating packet loss, and/or re-aligning of send times of different streams in relation to each other by adding additional communication services requiring resources from the industrial communication network or re-arranging network schedules.

12. Arrangement according to claim 8, wherein the devices comprise sensors and/or actuators.

13. Arrangement according to claim 8, wherein the Network Information Provider and Monitoring module (NTP) continuously monitors the application performance quality and in case of deviations from pre-defined minimum requirements generates an alarm.

14. Arrangement according to claim 8, wherein the digital twin uses status feedback data of real machinery the application is dedicated for to modify the communication characteristics.

* * * * *